United States Patent [19]

Hosterman et al.

[11] 4,232,698

[45] Nov. 11, 1980

[54] PRESSURE RELIEF VALVE WITH PRESSURE INDICATING MEANS

[75] Inventors: Craig Hosterman, Scottsdale; William J. Kerwin, Tucson, both of Ariz.

[73] Assignee: Products of Advanced Technology, Inc., Phoenix, Ariz.

[21] Appl. No.: 946,627

[22] Filed: Sep. 28, 1978

[51] Int. Cl.³ .................... F16K 17/40; G01L 9/12
[52] U.S. Cl. ................................. 137/68 R; 73/724; 137/557; 361/283
[58] Field of Search .................... 73/718, 724, 714; 361/283; 220/89 A; 137/68 R, 557

[56] References Cited

U.S. PATENT DOCUMENTS

| | | | |
|---|---|---|---|
| 2,355,088 | 8/1944 | Lavoie | 361/283 X |
| 2,367,866 | 1/1945 | Humphreys et al. | 73/724 |
| 2,526,794 | 10/1950 | Andrews | 220/89 A |
| 3,222,581 | 12/1965 | Lenfant | 361/283 |

*Primary Examiner*—Martin P. Schwadron
*Assistant Examiner*—Richard Gerard
*Attorney, Agent, or Firm*—Cahill, Sutton & Thomas

[57] ABSTRACT

An adjustably positionable element having a curved end plate is located in proximity to the conventional rupturable curved disc in a pressure relief valve for high pressure cylinders. The end plate serves as one plate of a capacitor and the curved disc serves as the other plate. Impedance variation responsive circuitry senses any change in impedance of the capacitor due to a change in flex of the curved disc brought about by a variation in pressure within the cylinder to which the relief valve is attached. The change in impedance is calibrated to provide an indication of the actual pressure within the cylinder.

11 Claims, 4 Drawing Figures

PRESSURE RELIEF VALVE WITH PRESSURE INDICATING MEANS

The present invention relates to pressure relief valves and, more particularly, to pressure relief valves which provide an indication of the pressure within the high pressure cylinder to which the pressure relief valve is attached.

Conventional cylinders which house a fluid under pressure, whether the fluid be a liquid or gas, include a conventional valve for controlling the outflow of the fluid and an upstream located pressure relief valve. These cylinders, generally referred to as bottles, are usually filled at a depot to a predetermined pressure, which pressure equates with the quantity of fluid contained therein. During use of these bottles, pressure gauges are sometimes not employed and the quantity of the contents within the bottles is not always accurately known. Accordingly, the bottles are generally returned to the depot for refilling. Prior to refilling of the bottles, they are generally evacuated (perusant to federal regulations); thus, a user who returns for refilling of partly filled bottles will lose the benefit of the unused contents. This "lost cost factor" can be substantial over a period of time. Unnecessarily, the users of the bottles often waste time and effort in returning nearly filled bottles; moreover, sometimes the users misjudge the quantity of contents remaining and run out of fluid at inopportune moments.

It is of course possible to attach conventional gauges to the bottle and thereby obtain an accurate indication of the quantity of fluid remaining. However, the attachment of such gauges is time consuming. Another method of determining the contents of each bottle is that of weighing the bottle. However, such weighing requires accurate scales and detachment of the bottle from any equipment it might be attached to.

It is therefore a primary object of the present invention to provide a means for obtaining an indication of the pressure of a fluid within a high pressure cylinder.

Another object of the present invention is to provide an indication of the pressure of a fluid within a high pressure cylinder without tapping the cylinder.

Yet another object of the present invention is to provide a means for electrically determining the pressure of a fluid within a high pressure cylinder.

Still another object of the present invention is to provide a means for determining the pressure of a fluid within a high pressure cylinder with readily detachably attachable equipment.

A further object of the present invention is to provide a pressure relief valve having the capability of providing a signal reflective of the contents of a high pressure cylinder to which the pressure relief valve is attached.

A yet further object of the present invention is to provide a detectable impedance valve within a pressure relief valve, which impedance valve is reflective of the pressure acting upon the valve.

A still further object of the present invention is to provide a means for applying a conventional rupturable curved disc in a pressure relief valve as one plate of a capacitor, the impedance of which capacitor varies as the disc configuration varies due to pressure changes.

A still further object of the present invention is to provide an inexpensive pressure relief valve which has the capability of providing an indication of the pressure acting upon the valve.

These and other objects of the present invention will become apparent to those skilled in the art as the description thereof proceeds.

The present invention may be described with greater specificity and clarity with reference to the following drawings, in which.

Figure 1:
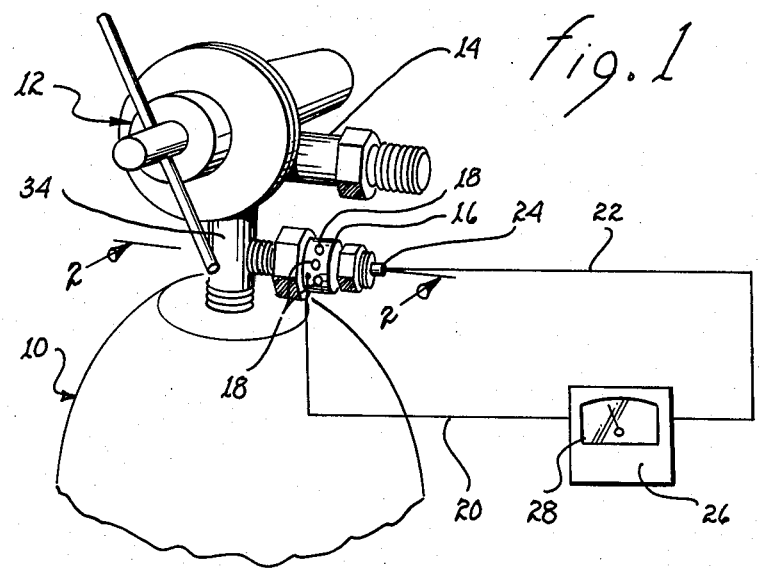
FIG. 1 illustrates a modified pressure relief valve mounted in the stem of a valve connected to a high pressure cylinder.

Referring to FIG. 1, there is shown a conventional high pressure cylinder or bottle 10 which might contain a fluid, such as oxygen, argon or other atmospheric gases. A conventional valve assembly 12, including an outlet pipe 14, is generally permanently attached to the bottle. It is to be understood that many configurations serving the function of valve assembly 12 are in commercial use. For most fluids, federal regulations require that a relief valve be attached to bottle 10 to prevent explosion in the event the pressure of the fluid within the bottle exceeds the pressure retaining capacity of the bottle. Therefore, most permanently attached valve assemblies also include a pressure relief valve, as indicated in FIG. 1 by the numeral 16.

In order to determine the degree of fill of bottle 10, a pressure gauge is generally used and from a pressure reading, the degree of fill can be calculated. The attachment of a pressure valve, such as to outlet pipe 14, is somewhat time consuming and necessitates a loss of fluid upon removal of the pressure gauge. For some fluids, such loss is inconsequential but where toxic or poisonous fluids are released, severe health hazards may be present. Additionally, some financial detriment results from the loss of fluid. But aside from these losses, the necessary time for an operator to attach a pressure gauge, obtain a reading therefrom and then detach the pressure gauge represents a substantial labor expense which should be avoided if possible.

As pressure relief valve 16 is necessarily always in fluid communication with the interior of bottle 10, the conventional rupturable element contained therein is responsive to the ambient pressure, generally by flexing. Should the pressure within bottle 10 increase beyond a specified upper limit, the flexing capability of the element will have been exceeded and it will rupture. Upon rupture, the fluid will flow through the rupture and be dissipated through relief ports 18 disposed in the pressure relief valve.

As the rupturable element flexes in response to pressure variations, such flexing, if the element constitutes one plate of a capacitor, produces a change in capacitance, or impedance, of the capacitor. By maintaining the second plate of the capacitor in fixed position, the variation in impedance of the capacitor due to the flexing element can be sensed by impedance responsive circuitry.

Referring still to FIG. 1, there is shown an electrical conductor 20 electrically attached to the housing of pressure relief valve 16, which housing is electrically attached to the flexing element. An electrical conductor 22 is electrically attached to lead 24 extending from the fixed plate of the capacitor. A sensing circuit 26 is responsive to a variation in an electrical signal across electrical conductors 20 and 22 resulting from a change in impedance of the capacitor. The response sensed may be displayed upon a meter 28 to reflect either the degree of pressure or thus the quantity of fluid within bottle 10.

Figure 2:
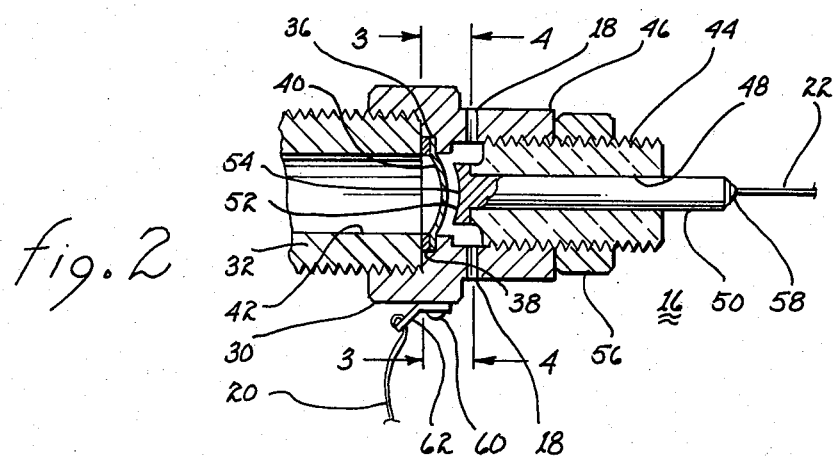
FIG. 2 is a cross-sectional view taken along lines 2—2, as shown in FIG. 1
Figure 3:
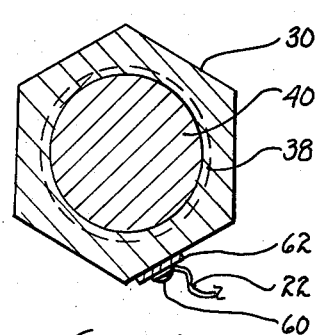
FIG. 3 is a cross-sectional view taken along lines 3—3, as shown in FIG. 2.
Figure 4:
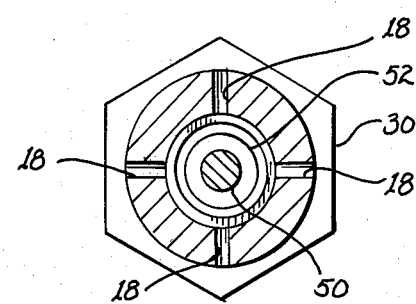
FIG. 4 is a cross-sectional view taken along lines 4—4, as shown in FIG. 2.

Referring jointly to FIGS. 2, 3, and 4, the constructional details of pressure relief valve 16 will be described. A collar 30 threadably engages a hollow stem 32 extending from outlet pipe 34 of valve assembly 12. Collar 30 by means of annular shoulder 36 and a malleable annular seat 38 sealingly secures a rupturable flexible curved disc 40 across outlet 42 of stem 32. Thereby, leakage through stem 32 will not occur unless disc 40 ruptures. In the event disc 40 ruptures, the fluid flow through the disc will be dissipated through relief ports 18 extending through the shank of collar 30.

Generally, disc 40 is of beryllium copper which has electrical properties suitable for employing the disc as one plate of a capacitor. An electrically insulating centrally apertured plug 44 is in threaded engagement with the interior surface of shank 46, which shank forms a part of collar 30. Central aperture 48 within plug 44 supports pedestal 50, one end of which includes an annularly expanded plate 50. Surface 54 of plate 50 in proximity to disc 40 may be curved to conform in general with the curvature of the disc; alternatively, this surface may be planar. Necessarily, pedestal 50 and plate 52 must be of electrically conductive material to render the plate capable of performing the function of a plate of a capacitor.

The degree of capacitance of the capacitor formed by disc 40 and plate 52 is variable by threading plug 44 into or out of shank 46 until a value commensurate with sensing circuit 26 is obtained. Once the degree of capacitance is achieved, the positional relationship of plate 52 to disc 40 is set by lock nut 56 threadably engaging plug 44 and the end of shank 46.

Electrical conductor 22 is electrically attached to pedestal 50 by solder 58 or by other conventional means. Electrical conductor 22 may be electrically attached to disc 40 by means of a bolt or machine screw 60 maintaining a tab 62 in electrical contact with collar 30.

As discussed above, as the pressure of the fluid within bottle 10 varies, disc 40 will have greater or lesser curvature in proportion to the pressure of the fluid. Such a difference in curvature will result in a section of the disc being in greater or lesser proximity to surface 54 of plate 52. This difference in spacing therebetween varies the impedance of the capacitor. Any impedance variation is sensed by sensing element 26 and meter 28 provides a visual indication of the change. The visual indication may be calibrated in either units of pressure or units of quantity of fluid.

The safety aspects of pressure relief valve 16 are not jeopardized by the above modifications thereto. As will be noted by inspection of FIG. 2, a cavity exists external to disc 40, which cavity is in communication with relief ports 18. Thus, the fluid, on rupture of the disc, will flow into the cavity from whence it will dissipate through the relief ports. Thus, all federal and state regulations pertinent to relief valves have been accommodated.

While the principles of the invention have now been made clear in an illustrative embodiment, there will be immediately obvious to those skilled in the art many modifications of structure, arrangement, proportions, elements, materials, and components, used in the practice of the invention which are particularly adapted for specific environments and operating requirements without departing from those principles.

We claim:

1. A pressure relief valve apparatus operatively attached to a high pressure cylinder for providing an indication of the pressure within the cylinder, said apparatus comprising in combination:
   a. impedance means disposed within the pressure relief valve for providing an impedance representative of the pressure within the cylinder, said impedance means comprising a capacitor and including a flexible disc flexibly responsive to the pressure within the cylinder, said disc being electrically coupled as a positionable plate of said capacitor, said disc being rupturable in the event of a pressure rise within the cylinder above a predetermined value;
   (b) an end plate disposed in proximity to said disc in fixed relationship thereto, said end plate being electrically coupled as a fixed plate of said capacitor; and
   (c) means for sensing the impedance and providing an indication reflective of the pressure within the cylinder;
whereby, movement of said disc relative to said end plate varies the impedance of said capacitor.

2. The apparatus as set forth in claim 1 wherein said apparatus includes:
   a. an electrical insulator attached to the pressure relief valve;
   b. a pedestal for supporting said end plate; and
   c. means for maintaining said pedestal fixedly secured to said insulator for electrically insulating said end plate from said disc.

3. The apparatus as set forth in claim 2 wherein the pressure relief valve includes an internally threaded shank and said insulator includes external threads for mating with the internal threads of said shank.

4. The apparatus as set forth in claim 3 including relief ports disposed in proximity to said disc for venting the fluid from the cylinder in the event of rupture of said disc.

5. A pressure relief valve for high pressure cylinders, said pressure relief valve comprising in combination:
   a. a disc for flexibly responding to the pressure within the cylinder, said disc being rupturable in the event of a pressure rise within said cylinder above a predetermined value;
   b. an end plate disposed in proximity to said disc; and
   c. means for supporting said end plate and electrically insulating said end plate from said disc;
whereby, said disc and said end plate are electrically connectable as the plates of a capacitor.

6. The pressure relief valve as set forth in claim 5 wherein said end plate includes a pedestal and said insulating means includes means for securing said pedestal to said pressure relief valve.

7. The pressure relief valve as set forth in claim 6 wherein said pressure relief valve includes:
   a. a collar for securing one side of said disc in fluid communication with the contents of the cylinder;
   b. a hollow shank extending from said collar; and
   c. means for engaging said insulating means with said hollow shank to locate said end plate in proximity to said disc.

8. The pressure relief valve as set forth in claim 7 wherein said insulating means comprises an externally threaded apertured plug for receiving said pedestal and said hollow shank includes internal threads for mating with the external threads of said plug.

9. The pressure relief valve as set forth in claim 8 including means for sensing the impedance of the capacitor developed by said disc and said end plate.

10. The pressure relief valve as set forth in claim 5 including means for sensing the impedance of the capacitor developed by said disc and said end plate.

11. The pressure relief valve as set forth in claim 5 including relief ports disposed in proximity to said disc for venting the fluid from the cylinder in the event of rupture of said disc.

* * * * *